United States Patent
Bruski et al.

(10) Patent No.: US 7,933,734 B2
(45) Date of Patent: Apr. 26, 2011

(54) METHOD FOR TESTING AN ELECTRONIC CONTROL SYSTEM

(75) Inventors: Nicola Bruski, Paderborn (DE); Ralf Grosse Boerger, Paderborn (DE); Holger Krisp, Barsighausen (DE); Robert Leinfellner, Paderborn (DE); Eduard Miller, Salzkotten (DE); Jobst Richert, Lippstadt (DE); Thomas Woelfer, Paderborn (DE)

(73) Assignee: dSpace digital signal processing and control engineering GmbH, Paderborn (DE)

( * ) Notice: Subject to any disclaimer, the term of this patent is extended or adjusted under 35 U.S.C. 154(b) by 437 days.

(21) Appl. No.: 11/853,762

(22) Filed: Sep. 11, 2007

(65) Prior Publication Data

US 2008/0183456 A1 Jul. 31, 2008

(30) Foreign Application Priority Data

Sep. 11, 2006 (EP) .................................. 06018945

(51) Int. Cl.
*G06F 11/26* (2006.01)
*G06F 17/00* (2006.01)

(52) U.S. Cl. ........................ 702/117; 702/108; 700/29
(58) Field of Classification Search ................ 702/117, 702/108, 120, 124, 125
See application file for complete search history.

(56) References Cited

U.S. PATENT DOCUMENTS

| | | | |
|---|---|---|---|
| 5,557,774 A * | 9/1996 | Shimabukuro et al. | 703/21 |
| 6,006,166 A * | 12/1999 | Meyer | 702/119 |
| 6,023,773 A * | 2/2000 | O'Donnell et al. | 714/40 |
| 6,766,514 B1 | 7/2004 | Moore | |
| 2006/0277010 A1 * | 12/2006 | Schutte et al. | 703/8 |

OTHER PUBLICATIONS

AutomationDesk brochure, DSPACE, Feb. 2006.
RT-LAB Distributed Real-Time Power brochure, OPAL-RT, 2005.
EPO Search Report, for EP06018945, dated Feb. 15, 2007 (with translation of Examiner's Notes).
Abourida, et al., "Real-Time PC-Based Simulator of Electric Systems and Drives" IEEE APEC 2002, pp. 433-438.
Belanger, Jean, "Real-Time Simulation Technologies for the Simulation of Electric Drives and Large Systems" SAE 2004.
Development of a Real-Time Digital Control System With a Hardware-In-The-Loop Magnetic Levitation Device for Reinforcement of Controls Education, Panayiotis S. Shiakolas, et al., IEEE Transactions on Education, vol. 46, No. 1, Feb. 2003, pp. 79-87.

(Continued)

*Primary Examiner* — Hal D Wachsman
(74) *Attorney, Agent, or Firm* — Orrick Herrington & Sutcliffe LLP

(57) ABSTRACT

A method is presented and described for testing of at least one electronic control system, in which the control system is connected via a data channel to a test device, at least one environmental model is calculated on the test device and the environmental model interacts with the control system by output of environment model data via the test device to the control system and by receiving control system data from the control system via the data channel. The method according to the invention executes on the test device at least one test model to influence the environment model and/or to calculate the environment model and/or the electronic control system, in which the test model or the test models is or are executed functionally independently of the environment model and, during test operation, synchronously with the environment model.

13 Claims, 6 Drawing Sheets

OTHER PUBLICATIONS

A Hardware-In-The-Loop PC-Based System for Developing and Tuning Control Algorithms and Training, Sadashiva S. Godbole et al., Proceedings of the Industrial Computing Conference, Chicago, Sep. 19, 1993, pp. 595-603.

Real-Time Simulation, Control and HIL With Cots Computing Clusters, Marco Papini, et al., AIAA Modeling and Simulation Technologies Conference, Aug. 2001, pp. 1-6.

Extended European Search Report for EP07024786.1, dated Nov. 3, 2008 (with translation of Examiner's Notes).

* cited by examiner

METHOD FOR TESTING AN ELECTRONIC CONTROL SYSTEM

RELATED APPLICATIONS

Applicants hereby claim priority under 35 USC §119 to Application No EP 06 01 8945.3 entitled "Method for Testing an Electronic Control System" filed in the European Patent Office Sep. 11, 2006 which is herein incorporated by reference in its entirety.

FIELD OF THE INVENTION

The invention concerns a method for testing at least one electronic control system, in which the control system is connected via a data channel to a test device, at least one environment model is calculated on the test device, and the environment model interacts with the control system by output of environment model data via the test device to the control system and by receiving control system data from the control system via the data channel. Moreover, the invention concerns a scheduling method for execution of at least one test model on a simulation computer, in which a first scheduler is activated based on an external activation signal. Finally, the invention also concerns a test device for testing of at least one electronic control system, in which the test device can be connected via a data channel to the control system, at least one environment model is calculated with the test device and the environment model can interact with the control system by output of environment model data to the control system and by receiving control system data from the control system via the data channel.

BACKGROUND

Methods and devices for testing electronic control systems are known in different forms from practice and are mostly used in applied research and industrial development in the broad field of development and use of electronic control systems, namely, anywhere process control tasks in the broadest sense must be solved. The term "control system" is used below as an encompassing designation for a technical device that is essentially used for the tasks of measurement, control, regulation, calibration or the like. In the broadest sense, an electronic, program-controllable system is involved, which is usually called a control device in automotive applications. The term "control system" is not restricted to that which is narrowly defined in systems theory as feedback control, in which controls are ordinarily implemented on control systems.

The development of a control system that is ultimately usable in series production is generally accomplished in the following steps: during function development, by means of mathematical modeling tools, an abstract controller prototype is initially made from the later target hardware and environment, during which the controller so developed is only tested in a simulation with the process image, which also only exists as a mathematical model.

In the next step, in the so-called rapid control prototyping (RCP), the abstract controller prototype is converted by means of code generators to an executable program, which is operated on a usually very high-performance, real-time-capable control system, not comparable to the series control system ultimately to be used. This RCP control system then interacts via corresponding I/O interfaces with the real process being influenced. If these results are satisfactory, executable code for the series control system is again generated via correspondingly equipped code generators from the mathematical model of the controller, so that the control system actually to be used in series application can be equipped with the functionality, with which it must also be equipped in series application.

However, before the series control system is tested in conjunction with the real process, it is subjected to thorough tests, so-called hardware-in-the-loop-tests (HIL tests). During HIL tests, the (series) control system is connected to a test device, in which the functional environment of the control system being tested is simulated by means of an environment model; the control system therefore interacts with a virtual environment, in which the environment model is connected to the test device by output of environment data via the test device to the control system and by receiving control system data from the control system via a data channel.

The present invention is explained on the example of such an HIL test, but is not restricted conceptually to such a test situation. Instead, it is applicable to testing any control system that is connected to a test device and is tested by means of an environment model that is operated on the test device.

The control system, for example, can be an engine device in the area of automotive applications, in which the environment model of this engine control device is then an engine model, operated in real time on the test device. However, it can also be a running and engine dynamic model of an entire vehicle moved in a virtual environment. The environment model, in principle, need not cover all the interfaces of the control system being tested, but instead any parts of the environment can also be implemented by real components. In the preceding example, this could mean that the control system being tested is actually connected to a real internal combustion engine in which the environment of the engine (for example, transmission, drive train, chassis and road) is simulated by means of an environment model operated on the test device. The environment model therefore need not be a complete environment model, and it can be directly and/or indirectly connected to the control system being tested.

The actual test of the control system consists of deliberately influencing the environment model of the control system, namely, by a test model to influence the environment model. Such deliberate influencing, for example, during testing of a control system for brake systems, can lie in the fact that the parameters that describe the ground are varied over broad limits and the brake control system is brought to complete braking. To evaluate the control system, the behavior of the environment model is generally used, which, in the preceding example, could lie in determination of the delay of the entire system (i.e., the vehicle). It is also quite possible to also read out direct variables of state from the control system and use them to evaluate the control system.

Different methods and devices are known from the prior art that permit testing of control systems in the aforementioned sense. For example, it is known, for influencing the test device on which the environment model is operated, to provide an additional experimentation device next to the test device, which is connected to the test device. A test model is run on the experimentation device (generally a standard PC), which influences the environment model on the test device in the desired manner via a data connection between the experimentation device and the test device. The experimentation device then permits the test model to be designed with a graphic modeling environment, in which, depending on time and depending on the model quantities of the environment model, a specific test functionality can be stipulated (dSPACE GmbH: "Automation Desk: Test and Experiment Software"; Product description, February 2006). The drawback in this procedure is that strict synchronization between the environment model on the test device and the test model on the experimentation device cannot be guaranteed, since coupling between the two devices is connected with the dead times related to communication. In addition, during use of a standard operating system without real-time capability on the experimentation device, under some circumstances, strict real-time capability is not guaranteed. This means that an influence on the environment model planned in a certain calculation interval of the environment model cannot always occur in this calculation interval, which could lead to incorrect performance and incorrect interpretation of the test.

Real-time capability, in the sense of the present invention, means that processes, whose execution is prescribed and stipulated at a specified time, must be executed and accomplished strictly at this time. The question of real-time capability is therefore not connected to an absolute speed dimension for a calculation, but is only bound to fulfillment of the condition that actions planned within a time interval can also be executed within this time interval; real-time capability is consequently not necessarily the fastest possible execution of required actions, but reliable execution of these actions within the time prescribed for them.

In time-discrete systems that are operated with a certain (generally fixed) calculation and scanning frequency, the shortest time unit corresponds to the length of the (fixed) scanning interval with the control system. If a control system, for example, is scanned and calculated with a millisecond, the environment model is ordinarily also operated at least with this scanning rate. This means that the model quantities of the environment model (i.e., the quantities of state of the environment model in terms of systems theory) are calculated with a frequency of 1 kHz, and the output quantities of the environment model are also calculated with a frequency of 1 kHz and are output to influence the control system.

All actions that are executed within a scanning or calculation interval (in the present example, within a millisecond) take place simultaneously for the time-discrete scanning system; these actions cannot be distinguished from each other in time. Starting from this definition of real-time capability and simultaneity, it is therefore possible to carry out several actions simultaneously, even if an electronic control system or test device that can process instructions only strictly sequentially is used, if they are executed in the same scanning or calculation interval.

The advantage of the test method just described consists of the fact that, for execution of the tests, the environment model need not be stopped or changed, in which real-time conditions, however, cannot be reliably maintained at small scanning rates, since the usual experimentation devices, based on an operating system without real-time capability, cannot guarantee predictable executions in terms of time.

In another method for testing an electronic control system known from the prior art the environment model is instrumented by call-up of test functions. The environment model is consequently no longer independent of the test being performed and must therefore always be adapted when the test is changed. A shortcoming in this method is that the test model and the environment model are functionally dependent on each other, since the environment model must be instrumented with special function call-ups concerning the test model (OPAL-RT TECHNOLOGIES INC.: "RT-LAB, Product Description, Feature Details, Typical Applications"; 2005). This creates a significant overhead within the environment model and therefore leads to significant running time drawbacks under some circumstances, even if the functionality of the test model is a "null functionality."

SUMMARY

An underlying task of the invention is therefore to provide a method and device for testing of an electronic control system, in which the aforementioned drawbacks are at least partially avoided.

The aforementioned task is solved according to one aspect of the invention according to a first teaching of the invention in a method for testing at least one electronic control system with a test device and an environment model calculated on the test device, in which the control system is connected via a data channel to the test device and the environment model interacts with the control system by output of environment model data via the test device to the control system and by receiving control system data from the control system via the data channel, in that at least one test model to influence the environment model and/or calculate the environment model and/or electronic control system is executed on the test device, in which the test model or the test models is or are executed functionally independently of the environment model and synchronously with the environment model during test operation.

This example method, according to the invention, is advantageous in a number of respects relative to the methods known from the prior art. Owing to the fact that the test model is executed functionally independently of the environment model, the environment model no longer needs to be instrumented with deliberately positioned function calls with reference to the test model. On the one hand, this has the advantage that the environment model is universally applicable, independently of the test being performed, and, on the other hand, this procedure entails the advantage that unutilized function call-ups in the test model no longer burden the running time of the environment model. In addition, dead times and asynchronism between execution of the environment model and the test model are avoided in the method according to the invention relative to those methods, in which the environment model of the test device is influenced by a configuration device separate from it in terms of hardware, or by a test model operated on the configuration devices.

In one advantageous embodiment of the invention, the test model influences the environment model, in which, with knowledge of the memory locations of the environment quantities of the environment model, it describes and/or reads out these memory locations. By direct access of the test model to the model quantities of the environment model, a software interface between the two models can be dispensed with which entails significant running time advantages.

According to another embodiment of the method according to the invention, a configuration device is connected to the test device via an additional data channel and the test model and/or environment model are then transferred via the additional data channel from the configuration device to the test device. By this embodiment of the method, it is also possible to create, modify or merely record the test model and/or environment model via the configuration device, which consists of a commercial PC with corresponding modeling software, in order to then transfer it deliberately to the test device. The configuration device in this embodiment of the invention is used as a user interface, via which the user has access to the target hardware, i.e., the test device.

In another embodiment, the method according to the invention is characterized by the fact that the simultaneous execution of at least one of the performed test models is stopped in the running time of the environment model, so that an overall test, consisting of several test models, can be varied over a wide range. It is also prescribed in the method according to the invention that at least one test model (as a substitute or in addition) is also loaded during test operation on the test device and executed there. Naturally, a test model already situated on the test device can likewise be executed at any time on the test device, regardless of whether the test model was loaded immediately beforehand on the test device, or whether the test model being started had already been present for a longer time on the test device.

In still another embodiment of the method, the test model, if necessary, is executed in an operating mode asynchronous with the environment model, in order to then be executed synchronously with the environment model. This is advantageous when the test model is started and extensive initializations must be conducted in the context of starting. Such initialization procedures can be so extensive, that they cannot be conducted within a scanning interval, so that a violation of the real-time requirements or the requirement for synchronism between the test model and environment model would be produced. In such a case, the method according to the invention proposes that the real-time and synchronism requirements be temporarily reset, until the calculation overhang is dealt with, to the extent that the test model can again be executed with the environment model synchronously and therefore guarantee the real-time requirements. Such a situation will occur when a test model is newly loaded onto the test device and is to be integrated in an already running test of the electronic control system.

In another embodiment, the method according to the invention is configured, so that the test model is converted to an execution format that is executed on the test device by an interpreter. In yet another embodiment, this execution format exists in byte code, which is executed on the test device by a real-time interpreter. Execution of the machine-independent byte code by the interpreter is connected, in principle, with a time drawback, since the interpreter, which is often referred to as a virtual machine, cannot directly execute the byte code, but must translate it beforehand. For this reason, the real-time interpreter is used in conjunction with an adjusted time compiler, which, at the beginning of the running time of the test model, translates the byte code once into a machine-dependent machine code. It is useful in this case to run the test model during the translation phase in an asynchronous mode relative to the environment model, as was already described on the example of initialization of a test model.

In another advantageous embodiment of the invention, for synchronization of the test model with the environment model, an activation signal to activate the test model is generated by the environment model. Generation of the activation signal by the environment model is consistent with the requirement of functional independence between the environment model and the test model, since no function call directly concerning the test model occurs from the environment model, as is known from the prior art. The activation signal serves merely as a timer for execution of the test model, which, however, can be executed fully independently of the environment model.

It is prescribed that the activation signal is to be generated in each or each whole-number multiple of the calculation interval of the environment model, so that the test model can also be calculated as a time-discrete scanning system. The activation signal is then generated by the environment model in an example embodiment, if it is ensured that the characteristic phases of the model calculation or handling are concluded. Such phases include, for example, recording of all input quantities of the environment model, calculation of the quantities of state of the environment model from the actual input quantities and from previous quantities of state of the environment model, or also output of output quantities from the environment model. By this handling of the method according to the invention, it is guaranteed that the environment model is situated in a time-consistent state and the test model, as a result of this, can access a consistent set of model quantities of the environment model.

According to another advantageous embodiment of the method according to the invention, a scheduling method is activated by the activation signal, which coordinates execution of the test model. It is also apparent from this property that by activation, a functional decoupling between the environment model and the test model is guaranteed, since the test model is subsequently coordinated independently of the environment model by a higher-order coordination unit—the so-called scheduling method.

A second teaching of the invention is geared toward the embodiment of the scheduling method, in which, based on an external activation signal, a scheduler is activated. The scheduling method solves the aforementioned task according to the invention in that the first scheduler brings the test model to execution or part of the test model to execution, which corresponds to a stipulated calculation interval, and the first schedule after completion of execution of the test model or the stipulated part of the test model indicates termination of the calculation by a termination signal.

In order for the first schedule to enter into action, an activation signal is required, which is formed, for example, by an interrupt. The first scheduler activated in this way can make execution of the test model or a stipulated part of the test model independent of other parameters. Thus, values can be transferred to the first scheduler by transfer parameters on call-up, or the scheduler on activation can read out corresponding parameters from the memory cells prescribed for this, which inform the first scheduler about which test model or parts of test models are to be calculated, and for which calculation interval these test models or parts of the test models are to be executed. Owing to the fact that the first scheduler, after complete execution of the test model or the stipulated part of the test model, indicates termination of calculation by termination signal, it is possible to react close in time with higher order or coordinated systems, like the environment model, in order to continue their course, for example.

According to another embodiment of the scheduling method according to the invention, the first scheduler, in a situation in which the test model has several test strings to be processed simultaneously, calls up a second scheduler, indicating the test strings to be simultaneously processed, whereupon the second scheduler causes successive execution of the test strings to be processed simultaneously and, after completion of all test strings to be processed simultaneously, indicates termination of execution to the first scheduler, whereupon the first scheduler indicates termination of calculation by a termination signal.

The term simultaneity is to be interpreted precisely here as explained previously in conjunction with real-time simulations. All those processes that are processed within the stipulated smallest time resolution of the test device are considered simultaneous in the sense of the second teaching; consequently, the calculations, actually conducted one after the other in physical time, can also be interpreted as simultaneous according to the stated definition. There is no contradiction, to the extent that the second scheduler, responsible for processing the test strings of a test model being processed simultaneously, causes the test strings being processed simultaneously to be executed in succession. The test strings being processed simultaneously within a test model can be simply the generation of two different test signals, with which a control system is to be acted upon.

The scheduling method according to one aspect of the invention experiences a particularly advantageous embodiment, in that the first scheduler, in a case in which several test models or parts of several test models are to be calculated simultaneously, calls up a second scheduler assigned to each test model, so that only a Second scheduler is always active, the corresponding active second scheduler indicates to the first scheduler termination of execution of the test model assigned to it, whereupon the first scheduler activates another (previously unactivated) second scheduler, until all test models or parts of test models have been calculated, whereupon the first scheduler indicates termination of calculation by a termination signal. The described method according to the invention is particularly clear and very simple to implement and permits checking of complete processing of several test models in particularly simple fashion. The different embodiments of the scheduling method according to the invention, with reference to treatment of several test strings to be processed simultaneously within a test model and with respect to simultaneous processing of several test models, can naturally be easily combined with each other.

According to another teaching of the invention, the task just mentioned, according to the invention, is solved in a test device for testing of at least one electronic control system, in that at least one test model is executed on the test device to influence the environment model and/or to calculate the environment model and/or the electronic control system, in which the test model can be executed functionally independently from the environment model and (during test operation) synchronously with the environment model.

The test device according to the invention, in another example, is configured, so that process steps can be executed with it that have been described within the context of this invention with respect to the test of at least one electronic control system.

There are now a variety of possibilities of equipping and modifying the method according to the invention for testing of an electronic control system, the scheduling method according to the invention and the test device according to the invention. For this purpose, the claims subordinate to Claims 1, 9 and 12 are referred to, and also the description of the practical examples shown in the drawing of the test model according to the invention and the scheduling method according to the invention.

DETAILED DESCRIPTION OF THE DRAWINGS

FIGS. 1 to 6B show, by means of different practical examples, specific aspects of the test model according to the invention, the scheduling method according to the invention and the test device according to the invention.

Figure 1:
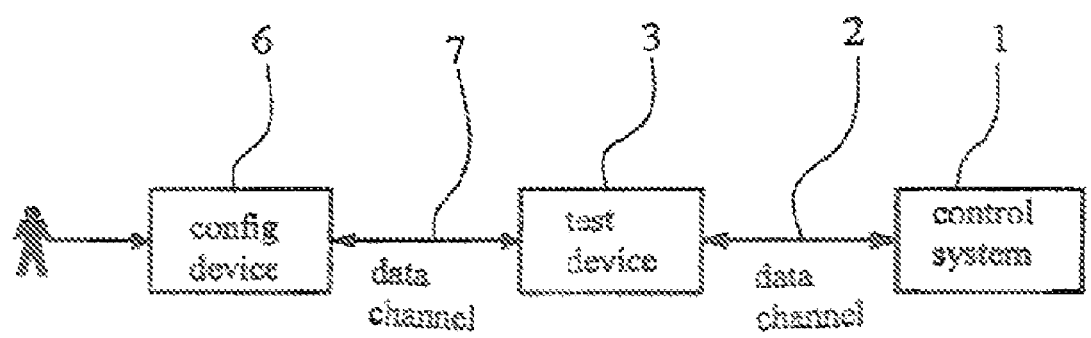
FIG. 1 shows a schematic view of a practical example of an arrangement of an electronic control system, test device and configuration device.

FIG. 1 shows the typical design of a test environment for testing electronic control system 1, which is suitable for execution of the method according to the invention. The electronic control system 1 to be tested is connected here via a data channel 2 to a test device 3. An environment model 4 (FIGS. 2-4, 6A and 6B) is calculated on test device 3, in which the environment model 4 interacts with the control system 1 by output of environment model data via the test device 3 to the control system 1 and by receiving control system data from the control system 1 via data channel 2.

In principle, testing of the control system 1 via the test device 3 occurs by influencing the environment model 4, which is executed on test device 3. For this purpose, a test model 5 (FIGS. 2, 3, 6A and 6B) to influence the environment model 4 and/or to calculate the environment model 4 and/or the electronic control system 1 is executed on the test device 3, in which the test model 5 of the test models 5, 5a (FIG. 4), 5b (FIG. 4) are executed functionally independently of the environment model 4 and, during test operation, synchronously with the environment model 4. The environment model 4 itself and calculation of the environment model 4 can be influenced, for example, by changing the parameters of the environment model 4. However, it is equally possible, with the method implemented on test device 3, to influence the control system 1 being tested directly via the data channel 2 via test model 5, i.e., by applying test signals.

It is advantageous in the practical example depicted in FIG. 1 of the test device 3, or the test method executed on test device 3, that the test model 5 is executed functionally independently from the environment model 4, so that the environment model 4 is not changed or need not be adapted even during changes of test model 5.

In the test device 3 according to FIGS. 1 to 4, the functional independence of environment model 4 from the test model 5 is achieved by describing and/or reading-out memory locations by test model 5 with knowledge of the memory locations of the model quantities of the environment model 4. Test model 5 can be arbitrarily altered (even during the running time of the environment model 4), without having to adapt the environment model 4 in any way. Because of the direct access of the test model 5 to the model quantities of the environment model 4 achieved in this way, an interface can be dispensed with, with which the model quantities of the environment model 4 must be made accessible, for which reason the depicted method entails significant running time advantages.

FIG. 1 also shows that a device 3 was connected to a configuration device 6 via another data channel 7, so that the test model 5 and the environment model 4 can subsequently be transferred via the additional data channel 7 from configuration device 6 to test device 3. The configuration device in the practical example depicted in FIG. 1 serves as a user interface, which enables the user to influence the test device 3 as desired.

Because of the functional independence between the environment model 4 and the test model 5, it is readily possible, during the running time of environment model 4, to stop execution of test model 5 or one of the executed test models 5a, 5b (FIG. 4) on test device 3, just as it is also possible to load a test model 5 on test device 3 and execute it. Activation of a test model 5, 5a, 5b in the depicted practical examples, independently of the loading process of a test model 5, 5a, 5b, is encountered, for example, when all test models 5, 5a, 5b, already at the beginning of the test of control system 1, were present on test device 3, but are to be executed not simultaneously, but with a time offset.

In the practical examples depicted in FIGS. 1 to 6B, each test model 5, 5a, 5b, at the beginning of its running time, is executed in an asynchronous operating mode relative to environment model 4, until all the initialization processes of the test models 5, 5a, 5b are concluded, which would prevent execution of test operation in real time. Because of this, configuration of the test method, the real-time and synchronism requirements can be reset temporarily; so that there is no hazard that the test process is interrupted, because of violation of these requirements, although the already initialized test models 5, 5a, 5b can be executed easily with fulfillment of these requirements on the test device 3.

The test device or the depicted test model, as shown in FIGS. 1 to 6B 6, is configured, so that each test model 5, 5a, 5b is present on the test device 3 in an execution format or is converted to an execution format, that is executed by an interpreter implemented on the test device 3. In the practical examples, a real-time interpreter is involved, which translates the test models 5, 5a, 5b, present in the form of byte code, and executes them.

In the depicted practical examples for synchronization of the test models 5, 5a, 5b with the environment model 4, an activation signal 8 (FIGS. 2-4) is generated by the environment model 4 to activate test models 5, 5a, 5b. Activation signal 8 fills the function of a timer for execution of test models 5, 5a, 5b, in which the required functional independence between the environment model 4 and the test models 5, 5a, 5b is also ensured. Generation of the activation signal 8 is shown, in particular, in FIGS. 2 to 4 and 6. In the practical examples, the activation signal 8 is generated in each calculation interval 9 (FIGS. 5A, 5B, 6A, and 6B) of the environment model 4, so that the test models 5, 5a, 5b can be executed with precise time synchronization with environment model 4.

In the practical examples, the activation signal 8 is issued after all input quantities of the environment model 4 have been entered and all model quantities of the environment model 4 (optionally using these input quantities) have been calculated. This ensures that influencing of the environment model 4 by test models 5, 5a, 5b occurs when the environment model has a consistent dataset.

As shown in FIGS. 2 to 4, 6A and 6B, a scheduling method is activated by the activation signal 8, which coordinates executions of the test model 5, so that the functional independence between environment model 4 and test model 5 also remains ensured.

Figure 2:
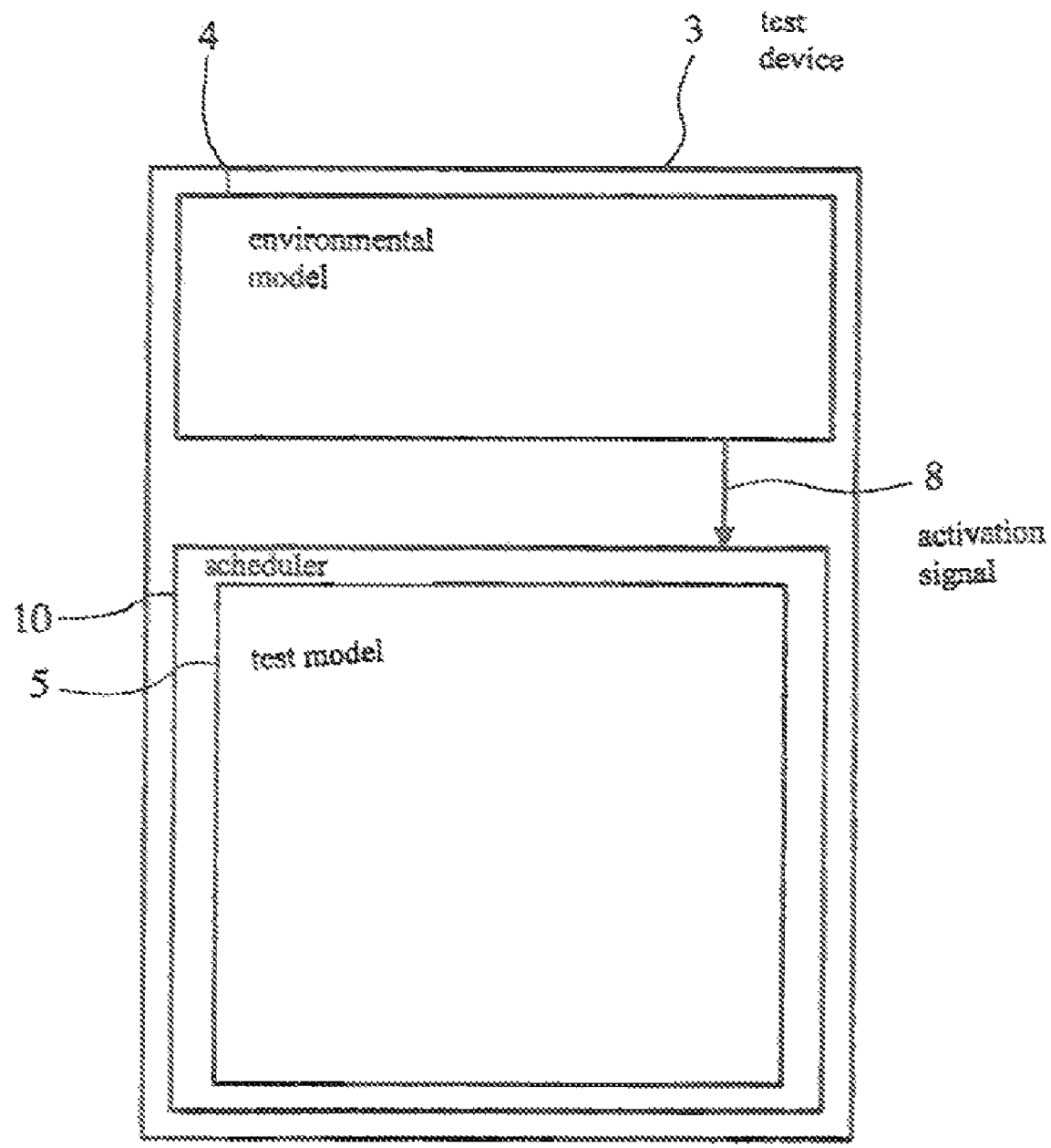
FIG. 2 shows a schematic view of a practical example of the test model according to the invention, the scheduling method according to the invention and the test device according to the invention.

The scheduling method is configured in the practical examples according to FIGS. 1 to 6B in a specific manner, in order to be able to meet the real-time and synchronism requirements in particularly advantageous fashion. For this purpose, based on the activation signal 8, a first scheduler 10 (FIGS. 2-4, 6A and 6B) is initially activated, in which the first scheduler 10 executes test model 5 (FIG. 2). Execution, can be directed in the practical examples only to part of the test models 5, 5a, 5b, which corresponds to a stipulated calculation interval 9. After completed execution of test models 5, 5a, 5b or the stipulated part of test models 5, 5a, 5b, the first scheduler 10 indicates termination of the calculation by a termination signal (not shown). It follows from this that the first scheduler 10 can make execution of test models 5, 5a, 5b independent of other parameters, for example, the system time or actual calculation interval 9. These parameters are transferred to the first scheduler 10 as call-up parameters in the depicted practical examples.

In other practical examples (not shown here), the first scheduler 10 receives these and other parameters by read-out of a parameter memory area prescribed for this. These parameters can generally also contain information as to which of the test models 5, 5a, 5b are to be executed or stopped.

Figure 3:
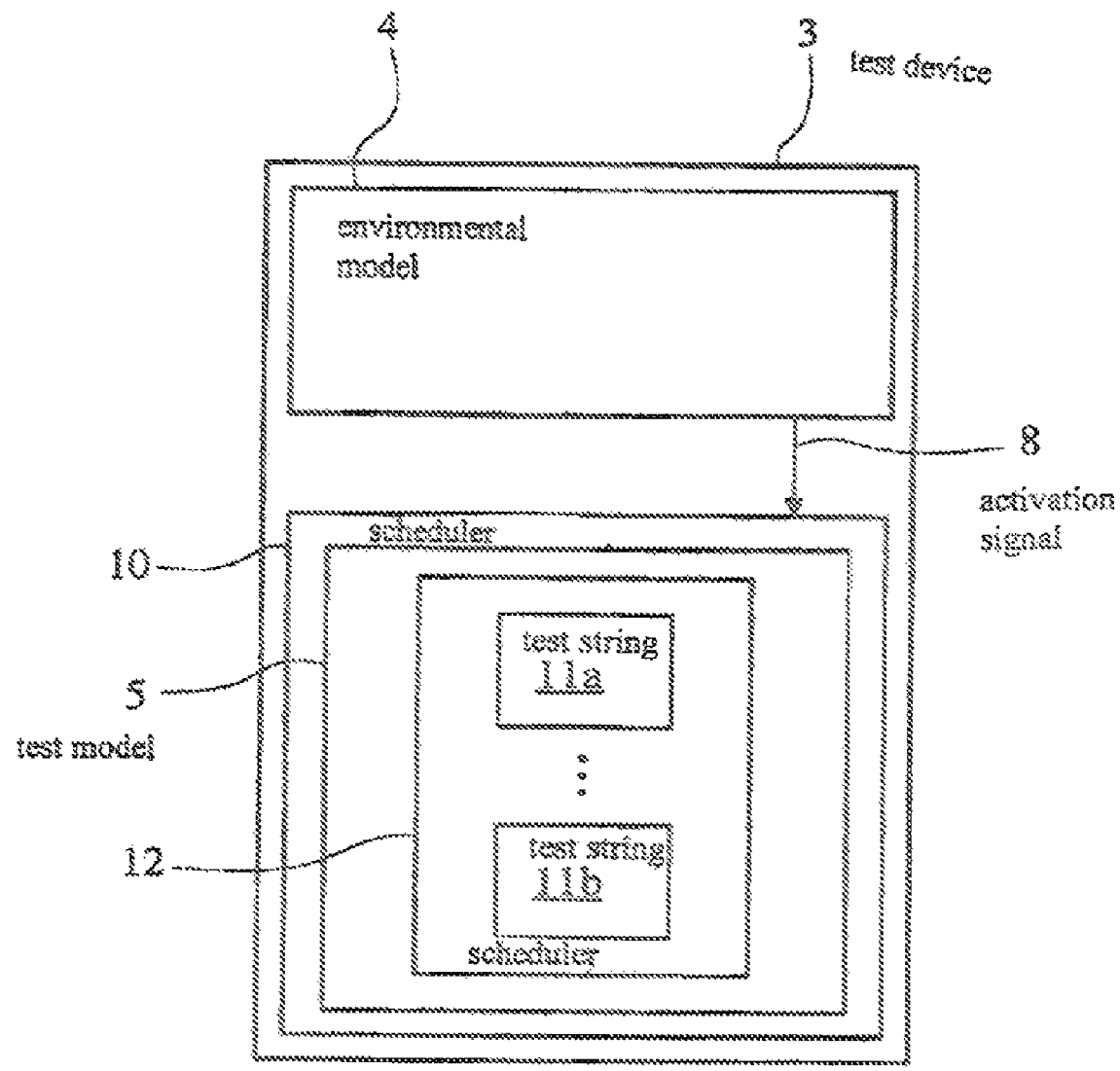
FIG. 3 shows a schematic view of another practical example of the temperature according to the invention, the scheduling method according to the invention and the test device according to the invention.

A test model 5, 5a, 5b can include several test strings 11a, 11b and 11c, 11d, (FIGS. 3 and 4) in which the test strings 11a, 11b, 11c, 11d are to be understood to mean those parts of a test model 5, 5a, 5b that are to be executed simultaneously, i.e., within a calculation interval 9. In a case, in which the test model 5, 5a, 5b has several test strings 11a, 11b, 11c, 11d to be processed simultaneously, the first scheduler 10 calls up a second scheduler 12 (FIG. 3), 12a (FIG. 4), 12b (FIG. 4), optionally with indication of the test strings to be processed simultaneously, whereupon the second scheduler 12, 12a, 12b causes execution of the test strings 11a, 11b, 11c, 11d to be processed simultaneously in succession and, after completion of all test strings 11a, 11b, 11c, 11d to be processed simultaneously, indicates termination of execution to the first scheduler 10. The first scheduler 10 indicates termination of calculation by a termination signal. FIG. 3 shows that a single test model 5 includes several test strings 11a, 11b that are processed systematically by means of the indicated method.

Figure 4:
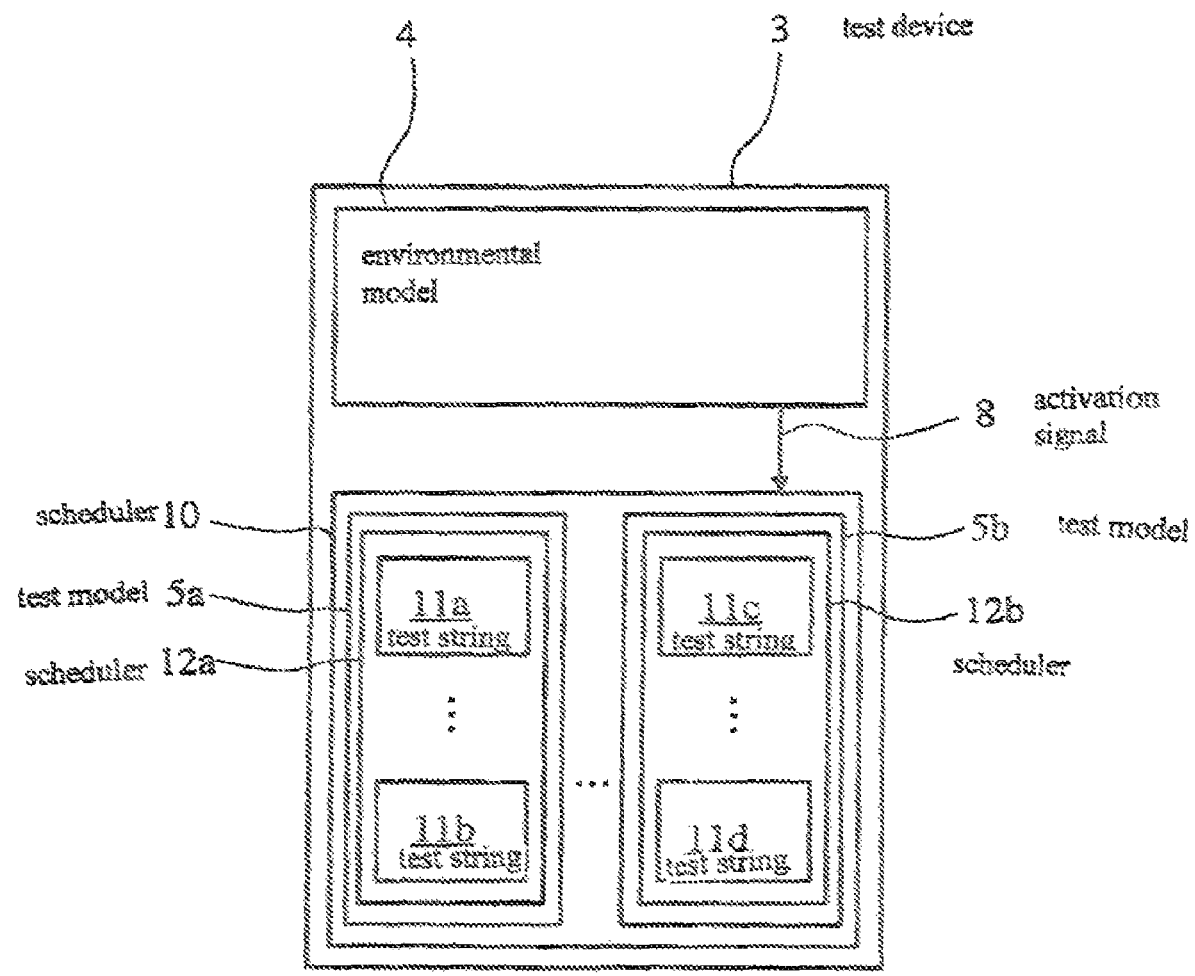
FIG. 4 shows a schematic view of another practical example of the test model according to the invention, the scheduling method according to the invention and the test device according to the invention.

In a case in which several test models 5, 5a, 5b or parts of several test models 5, 5a, 5b are to be calculated simultaneously, it is prescribed in the practical example according to FIG. 4 that the first scheduler 10 assigns to each test model 5, 5a, 5b a second scheduler 12a, 12b and calls up the second scheduler 12a, 12b assigned to each test model 5, 5a, 5b, so that only one second scheduler 12a, 12b is always active, the corresponding active second scheduler 12a, 12b indicates to the first scheduler 10 termination of execution of the test model 5, 5a, 5b assigned to it, whereupon the first scheduler 10 activates an additionally (previously unactivated) second scheduler 12a, 12b, until all test models 5, 5a, 5b or parts of test models 5, 5a, 5b have been calculated, whereupon the first scheduler 10 indicates termination of calculation by a termination signal. This method is particularly clear and simple to implement and permits checking complete processing of several test models 5, 5a, 5b in simple fashion.

The practical example according to FIG. 4 also shows that the described properties of the scheduling method can also be used combined, i.e., in a case in which several of the test models 5, 5a, 5b have parallel test strings 11a, 11b, 11c, 11d.

Figure 5A:
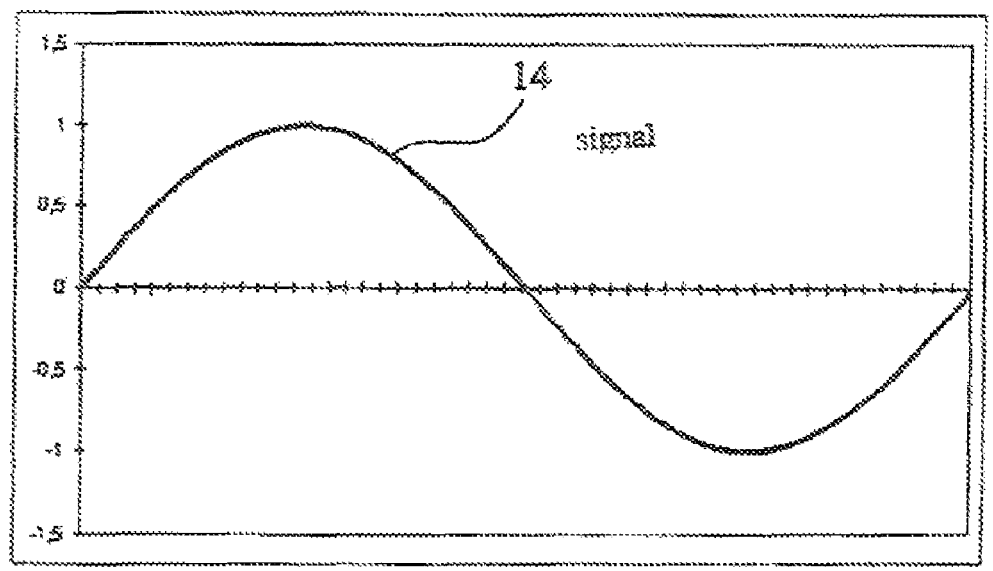
FIGS. 5A and 5B show a sine curve, which was generated with a practical example of the test model according to the invention, the scheduling method according to the invention and the test device according to the invention.
Figure 5B:
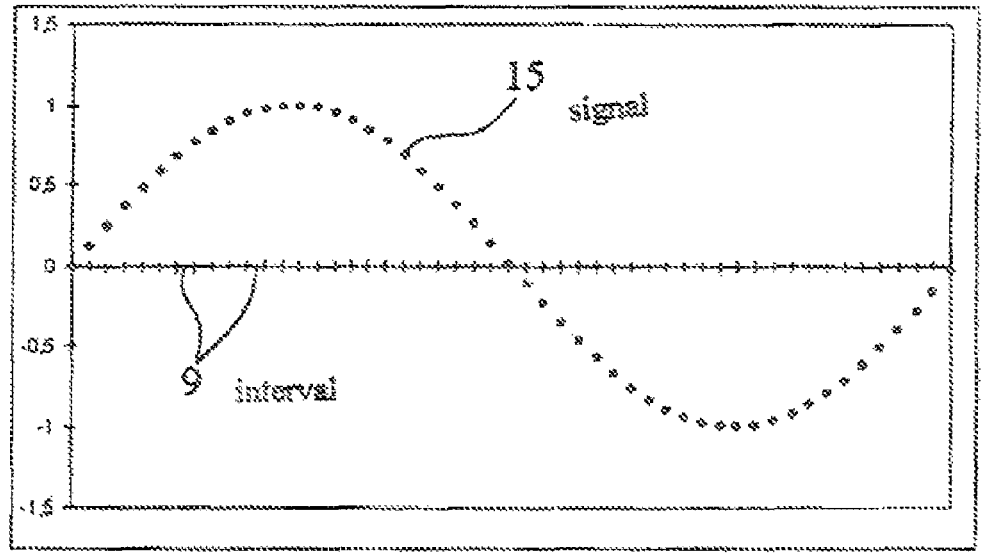

The practical example depicted in FIGS. 5A, 5B, 6A, and 6B explains the method of function of the test method, scheduling method and the test device by means of a practical example, in which a sinusoidal signal is to be output as test signal by the test device 3. FIGS. 5A and 5B show a continuous sinusoidal signal 14, as well as a time-discrete signal 15 to be generated by the test device 3 or the test model 5, with consideration of the calculation interval 9 of the environment model 4, which corresponds to the time-discretized continuous signal 14.

Figure 6A:
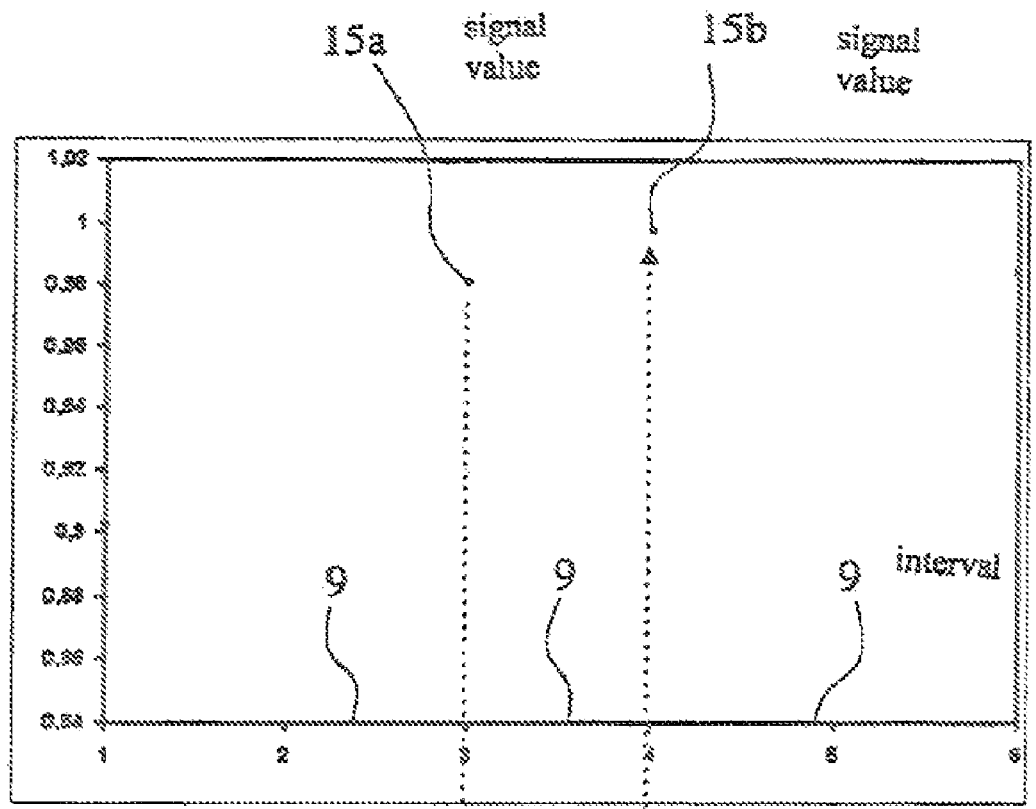
FIGS. 6A and 6B show interaction according to the invention of the components of the test model according to the invention, the scheduling method according to the invention and the test device according to the invention during generation of the sine curve according to FIGS. 5A and 5B.
Figure 6B:
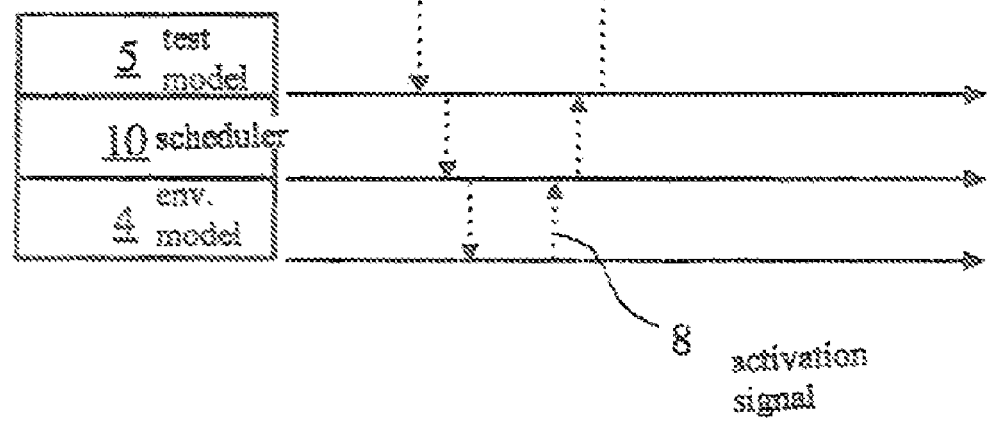

Successful calculation of the discrete signal value 15a at the beginning of the calculation interval designated with time unit "3" is the starting point of the consideration in FIGS. 6A and 6B; for simplification, it is assumed that the test models are always executed at the beginning of each calculation interval 9. Calculation Occurred by execution of the test model 5 close to time "3." After completed calculation of the signal value 15a, the first scheduler 10 refers back to the environment model 4 by output of a termination signal (dashed line, vertically downward arrows in FIG. 6 FIGS. 6A and 6B).

On reaching the next calculation interval 9 at a time of "4" time units, the environment model 4 generates the first scheduler 10 by the activation signal 8, which then calculates the test model 5 for the now current calculation interval 9, which ends in calculation of the signal value 15b (dashed line, vertically downward-pointing arrows in FIGS. 6A and 6B). The described process is continued for the next calculation intervals 9.

The invention claimed is:

1. A method, comprising:
testing an electronic control system, wherein the electronic control system is connected via a data channel to a test device, an environment model of the electronic control system is calculated on the test device by changing parameters of the environment model, and the environment model of the electronic control system interacts with the electronic control system via the data channel by output of environment model data via the test device to the electronic control system and by receiving control system data from the electronic control system, wherein testing the electronic control system comprises:
executing a test model on the test device to influence the environment model of the electronic control system, wherein the test model is executed functionally independently of the environment model of the electronic control system and synchronously with the environment model of the electronic control system.

2. The method according to claim 1, wherein the test model influences the environment model of the electronic control system by describing and reading-out memory locations with knowledge of the Memory locations of the model quantities of the environment model of the electronic control system.

3. The method according to claim 1 wherein a configuration device is connected to the test device via an additional data channel and the test model and the environment model of the electronic control system are transferred via the additional data channel from the configuration device to the test device.

4. The method according to claim 1, wherein a replacement test model is loaded on the test device and executed during running time of the environment model of the electronic control system.

5. The method according to claim 1 wherein the test model is executed in an operating mode asynchronous with the environment model of the electronic control system at the beginning of its running time for initialization.

6. The method according to claim 1 wherein the test model is converted to an execution format and executed on the test device by a real-time interpreter.

7. The method according to claim 1 wherein the environment model of the electronic control system, for synchronization of the test model, generates, an activation signal for activation of the test model, wherein the activation signal is generated in each whole-number multiple of a calculation interval of the environment model of the electronic control system.

8. The method according to claim 7, wherein the activation signal activates a scheduling method, and wherein the scheduling method coordinates execution of the test model.

9. The method according to claim 1, wherein execution of the test model is stopped during running time of the environment model of the electronic control system.

10. A method, comprising:
executing a test model on a test device, wherein an environment model of an electronic control system is calculated on the test device by changing parameters of the environment model, and wherein executing the test model comprises
activating a first scheduler based on an external activation signal;
executing, by the first scheduler, at least part of the test model the at least part of the test model corresponding to a calculation interval; and
indicating, by the first scheduler, a termination signal after completed execution of the at least part of the test model.

11. The method according to claim 10, further comprising:
requesting, by the first scheduler, additional processing from a second scheduler, wherein the first scheduler indicates test strings to be processed simultaneously by the second scheduler;
executing, by the second scheduler, the test strings to be processed simultaneously in succession;
indicating, by the second scheduler to the first scheduler, termination of execution after termination of all test strings to be processed simultaneously; and
indicating, by the first scheduler, a termination signal.

12. The method according to claim 10, further comprising:
requesting, by the first scheduler, additional calculating from a second scheduler assigned to a first additional test model;
executing, by the second scheduler, the first additional test model;
indicating, by the second scheduler to the first scheduler termination of execution of the first additional test model;
requesting, by the first scheduler, additional calculating by a third scheduler assigned to a second additional test model;
executing, by the third scheduler, the second additional test model;
indicating, by the third scheduler to the first scheduler termination of execution of the second additional test model; and
indicating, by the first scheduler, a termination signal.

13. An apparatus, comprising:
a test device for testing an electronic control system, the test device having loaded thereon a test model, wherein the test device is connected via a data channel to the electronic control system, an environment model of the electronic control system is calculated by changing parameters of the environment model with the test device, and the environment model of the electronic control system interacts with the electronic control system by output of environment model data to the electronic control system and by receiving control system data from the electronic control system via the data channel, wherein the test model is:
executed on the test device to influence the environment model of the electronic control system,
wherein the test model is executed functionally independently of the environment model of the electronic control system and synchronously with the environment model of the electronic control system.

* * * * *